United States Patent [19]
Urakami et al.

[11] Patent Number: 5,220,579
[45] Date of Patent: Jun. 15, 1993

[54] PULSE LASER

[75] Inventors: Tsuneyuki Urakami; Shinichiro Aoshima, both of Hamamatsu, Japan

[73] Assignee: Hamamatsu Photonics, K.K., Hamamatsu, Japan

[21] Appl. No.: 735,647

[22] Filed: Jul. 25, 1991

[30] Foreign Application Priority Data

Jul. 27, 1990 [JP] Japan .............................. 2-200970

[51] Int. Cl.$^5$ .............................................. H01S 3/08
[52] U.S. Cl. .......................................... 372/108; 372/9;
372/98; 372/103; 372/18; 372/10
[58] Field of Search ................... 372/103, 99, 10, 92,
372/100, 108, 8, 9, 98, 66, 18

[56] References Cited

U.S. PATENT DOCUMENTS 4,825,442  4/1989  Fitz ............................ 372/8
5,048,051  9/1991  Zayowski ...................... 372/9

Primary Examiner—Leon Scott, Jr.
Attorney, Agent, or Firm—Cushman, Darby & Cushman

[57] ABSTRACT

A pulse laser has a laser resonator, a laser medium in the laser resonator, and a deflecting device. The laser medium emits an emission light. The deflecting device switches an optical path of the emission light to output the emission light as a laser pulse. The deflecting device includes a deflecting member and a pumping device. The deflecting member is arranged in the optical path of the emission light. The deflection member has a refractive index which changes based on a pumping light incident thereon. The pumping device radiates the pumping light on a predetermined region of the deflection member and varies the refractive index of the predetermined region to switch the optical path of the emission light.

10 Claims, 6 Drawing Sheets

PULSE LASER

BACKGROUND OF THE INVENTION

1. Field of the Invention

The present invention relates to a pulse laser used in, e.g., a YAG-laser and, more particularly, to an apparatus for instantaneously switching an optical path of light emitted from a laser medium by a light deflector to extract the switched light outside a laser resonator, and outputting the light as pulse laser light.

2. Related Background Art

Conventionally, in pulse oscillation of a YAG laser, a Q-switch, a cavity damper, a mode locker, and the like are used, and an A/O or E/O device is used as a deflector for these oscillator. In the A/O device, an ultrasonic wave is supplied to an acoustooptic crystal such as $LiNbO_3$, $PbMoO_4$, $TeO_2$, or the like to bend emission light. The ultrasonic wave is repetitively supplied to instantaneously extract emission light from the laser medium outside a laser resonator at the same period as the ultrasonic wave, thereby outputting pulse laser light. In the E/O, a voltage is applied to an electrooptic crystal such as $LiNbO_3$, KDP, ADP, or the like to bend emission light. The voltage is repetitively applied to instantaneously extract emission light, thereby outputting pulse laser light.

In the light deflector, so-called switching for deflecting emission light by repeating radiation of an ultrasonic wave or application of a voltage is the most important factor which determines the pulse width and peak power of laser light, because, a pulse laser apparatus requires high-speed switching.

Since the conventional light deflector supplies an ultrasonic wave or applies an electric field to an optical crystal, its high-speed operation as an optical switch for switching emission light is limited.

SUMMARY OF THE INVENTION

It is an object of the present invention to provide a pulse laser which can achieve high-speed switching of a deflector.

It is another object of the present invention to provide a pulse laser which comprises a laser resonator, a laser medium arranged in the laser resonator, and deflector for instantaneously switching an optical path of emission light from the laser medium, and extracting the emission light outside the laser resonator as a laser pulse, wherein the deflector comprises a light-light deflection member arranged in the laser resonator, and pumping means for radiating pumping light into a predetermined region of the light-light deflection member, and changing a refractive index of the predetermined region so as to bend the optical path of the emission light.

In the above-mentioned pulse laser, a beam of the emission light generated by exciting the laser medium is bent by the light-light deflection member to be instantaneously extracted outside the laser resonator, and upon repetition of this operation, laser pulses are output. Deflection of the beam of the emission light by the light-light deflection member is performed by controlling the radiation amount of pumping light from the pumping means. More specifically, an ON state wherein the radiation intensity of the pumping light is increased to form a region having a different refractive index in the light-light deflection member to cause emission light to deflect, and an OFF state wherein the radiation intensity of the pumping light is decreased to cause emission light to go straight through the light-light deflection member, are repeated, thereby performing deflection control of emission light. A speed determining the pulse width in the ON state is defined as a switching speed.

In the pulse laser of the present invention, high-speed switching can be attained in synchronism with pumping light, and as a result, a laser pulse having an extremely small pulse width and large peak power can be output.

It is still another object of the present invention to provide a pulse laser which comprises a laser medium and deflector in a laser resonator, and instantaneously switches an optical path of emission light from the laser medium by the deflector to extract the emission light outside the laser resonator so as to output the emission light as a laser pulse, wherein the deflector comprises a light-light deflection member in which a refractive index change region is formed by pumping light radiated from a direction perpendicular to the optical path of the emission light to bend the emission light, and a pumping source for radiating the pumping light into the light-light deflection member.

In the above-mentioned pulse laser, a beam of the emission light generated by exciting the laser medium is deflected by the light-light deflection member to be instantaneously extracted outside the laser resonator, and upon repetition of this operation, a laser pulse is output. Deflection control of emission light by the light-light deflection member is attained by repeating an ON state wherein the pumping source is turned on to form the refractive index change region in the light-light deflection member so as to bend the beam of the emission light, and an OFF state wherein the pumping source is turned off to cause the emission light to go straight through the light-light deflection member. A speed determining the pulse width of the ON state is defined as a switching speed.

In this case, the pulse laser may comprise a Q-switch, a cavity damper, or a mode locker having the deflector.

In the Q-switch, the laser medium is kept excited in the laser resonator, and emission light is caused to fall outside its optical path to increase a loss. From this state, the pumping light for the light-light deflection member is set in the ON state to deflect the beam of the emission light, and to abruptly decrease the loss, thereby extracting laser light in a high-output state outside the laser resonator. The ON/OFF operations of the pumping source are repeated to output laser pulses. Contrary to this, pumping light is set in the ON state to cause emission light to escape outside the resonator by deflection so as to increase a loss. The loss is abruptly decreased by the next OFF state of the pumping light to oscillate the emission light. Upon repetition of these operations, laser pulses can be output.

Similarly, in the cavity damper, the laser medium is kept excited, and emission light is reciprocated in the laser resonator to keep a laser oscillation state, thereby increasing internal energy. From this state, pumping light for the light-light deflection member is set in the ON state to instantaneously extract the accumulated energy outside the resonator, thereby oscillating laser light. The On/OFF operations of the pumping source are repeated to output pulse laser beams. In this case, laser pulses may be output in the OFF state of the pumping light like in the Q-switch.

In the mode locker, the deflector serves as opening/closing means for a mode synchronization shutter.

More specifically, the shutter is opened/closed in the ON/OFF states of pumping light, and pulse laser light is output in the open or closed state.

Meanwhile, a portion of the laser medium may be used commonly as the light-light deflection member to simplify the structure of the apparatus.

Furthermore, the refractive index of the light-light deflection member is changed depending on the intensity of pumping light, and the light-light deflection member preferably comprises a mask formed with an opening for defining the radiation region or the refractive index change region capable of bending the beam of the emission light on the side of a surface irradiated with pumping light. In this apparatus, emission light can be deflected in a desired bending state in accordance with the intensity of pumping light or a mask pattern.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

A pulse laser according to the first embodiment of the present invention will be described below.

Figure 1A:
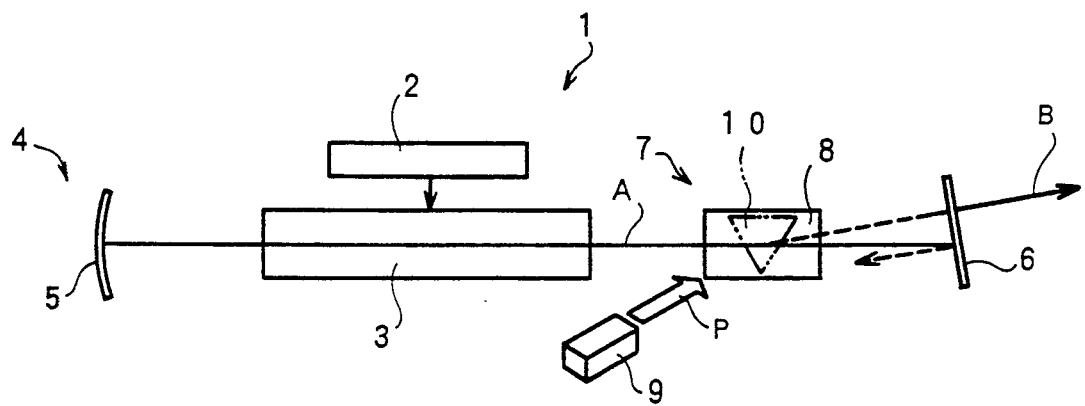
FIG. 1A is a diagram of an oscillator of a pulse laser according to the first embodiment of the present invention.

Referring to FIG. 1A, the pulse laser 1 is a so-called YAG laser. A lamp sealed with, e.g., xenon gas is used as an excitation medium 2, and a $Y_{3-x}Nd_xAl_5O_{12}$ crystal is used as a laser medium 3 for emitting stimulated light A upon excitation of the excitation medium 2. In addition, a Fabry-Pérot resonator comprising back and front mirrors 5 and 6 is used as a laser resonator 4 for oscillating the emission light A.

The back mirror 5 of the resonator 4 comprises a total reflection mirror, and the front mirror 6 comprises a partial transmission mirror as an output mirror. The front mirror 6 is inclined with respect to the back mirror 5 not to normally constitute a laser cavity. A Q-switch 7 is inserted on an optical path between the laser medium 3 and the front mirror 6. The Q-switch 7 comprises a light-light deflector 8 as a light-light deflecting member, and a pumping source 9 for radiating pumping light P onto the deflector 8. The pumping source 9 comprises a pulse laser or an LED which can be repetitively turned on/off at high speed. When the pumping light P is radiated onto the light-light deflector 8 in a direction perpendicular to the emission light A, a refractive index change region 10 equivalent to a prism can be formed in the light-light deflector 8. More specifically, an ON state of the pumping light P wherein the pumping source 9 is turned on to form the refractive index change region 10 in the light-light deflector 8 so as to bend the optical path of the emission light A, and an OFF state of the pumping light P wherein the pumping source 9 is turned off to cause the emission light A to go straight through the light-light deflector 8, can be repeated at high speed.

The laser medium 3 excited by the excitation medium 2 induces the emission light A. In the OFF state of the pumping light P, the emission light A is reflected by the back mirror 5, reaches the front mirror 6, and falls outside the optical path. More specifically, the emission light A is escaped to suppress laser oscillation, while excitation energy from the excitation medium 2 is accumulated in the laser medium 3 as an inverted population, thereby forming a high-loss state of the laser resonator 4. From this OFF state, the pumping light P having a predetermined light intensity is radiated onto the light-light deflector 8 to form the equivalent prism in the light-light deflector (ON state). The emission light A is deflected by the prism, and a cavity is formed between the mirrors 5 and 6. Thus, the resonator 4 is instantaneously set in a low-loss state, and the energy accumulated as the inverted population is immediately converted into photon energy in the resonator 4, thus causing laser oscillation. The above-mentioned ON and OFF states are repeated by turning on/off the pumping source 9, and the photon energy is output from the front mirror 6 as pulse laser light B.

In this manner, the laser light B is output by constituting the equivalent prism in the light-light deflector 8 upon radiation of the pumping light P, and the characteristic of output pulses are determined by the ON/OFF operations of the pumping source 9, i.e., the ON/OFF states (switching) of the pumping light P. In this case, a speed determining the pulse width of the ON state corresponds to a switching speed. Since switching is optically performed, a high-speed operation can be attained, and as a result, the laser light B having a small pulse width can be obtained. Since the pulse width can be decreased, the laser light B having a large peak value can be obtained. In addition, pulse oscillation of the laser light B can be easily controlled since it is obtained in synchronism with the ON/OFF operations of the pumping source 9, i.e., the ON/OFF states of the pumping light P.

Figure 1B:
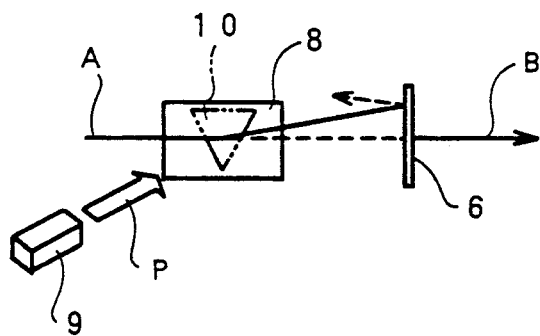
FIG. 1B is a diagram showing a modification of the pulse laser shown in FIG. 1A.

FIG. 1B shows a case wherein the ON/OFF states of the pumping light P for the light-light deflector 8 are reversed. More specifically, the mirrors 5 and 6 are arranged to be parallel to each other so as to constitute a cavity in the OFF state of the pumping light P. The pumping light P is initially set in the ON state, and the equivalent prism is formed in the light-light deflector 8 to deflect the emission light A, so that the emission light A falls outside the optical path to suppress laser oscillation. From this state, the pumping light P is set in the OFF state to instantaneously form a cavity, thereby extracting the laser light B. Upon repetition of these operations, the pulse laser light B is output. In this case, the same effect as described above can be provided. However, since the emission light A need only be deflected to fall outside the optical path, a deflection angle can be arbitrarily set, and the light intensity of the pumping light P for determining the angle need not be adjusted.

Figure 2:
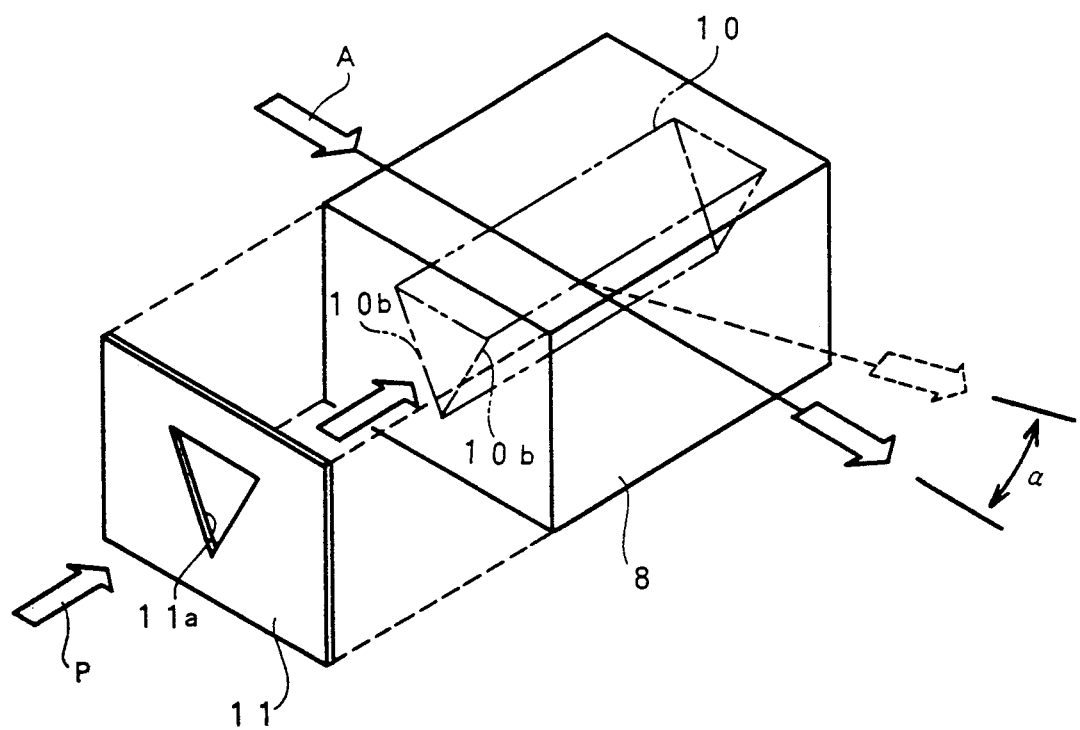
FIG. 2 is an exploded perspective view of a light-light deflection member shown in FIG. 1A.

The light-light deflector 8 will be described in detail below with reference to FIG. 2. The light-light deflector 8 comprises a quadrangular-prism crystal of a nonlinear medium for forming an equivalent prism in a portion irradiated with the pumping light P to deflect the emission light A. A mask 11 having a triangular opening 11a is arranged at an end portion of the deflector 8 which is irradiated with the pumping light P, and the other end portion is subjected to the transmission treatment over the entire surface. When the pumping light P is radiated into the deflector 8, the prism-like refractive index change region 10 having a refractive index different from the remaining portion is formed in the nonlinear medium. The refractive index of the refractive index change region 10 is changed according to the intensity of the pumping light P. More specifically, the emission light A is incident on the deflector 8 in a direction perpendicular to the pumping light P, and is switched between a state wherein it goes straight and a state wherein it is deflected, depending on the ON/OFF states of the pumping light P. The emission light A is deflected by the refractive index change region 10. Since the refractive index of the region 10 is changed according to the intensity of the pumping light P, a deflection angle a can be desirably controlled by the intensity of the pumping light P.

In this embodiment, the prism-like refractive index change region 10 is formed using the mask 11 having the triangular opening 11a. However, the present invention is not limited to this. The opening pattern of the mask 11 can be arbitrarily modified as long as the normals to input and output surfaces 10a and 10b of the emission light A do not coincide with the incident direction of the emission light A.

Figure 3A:
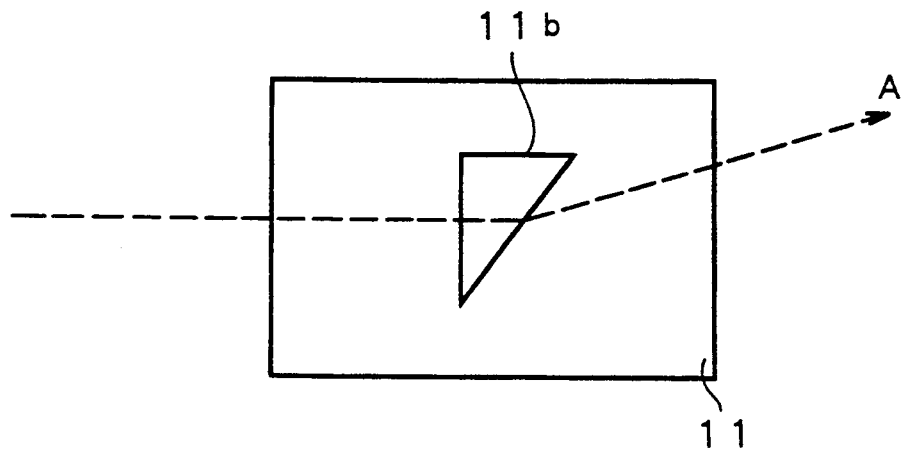
FIGS. 3A and 3B show modifications of a mask shown in FIG. 2.

FIG. 3A shows a modification wherein a right-triangular opening 11b is formed in the mask 11. In this case, the emission light A is incident on the refractive index change region 10 in a direction perpendicular thereto, and is deflected upward when it emerges from the region 10.

Figure 3B:
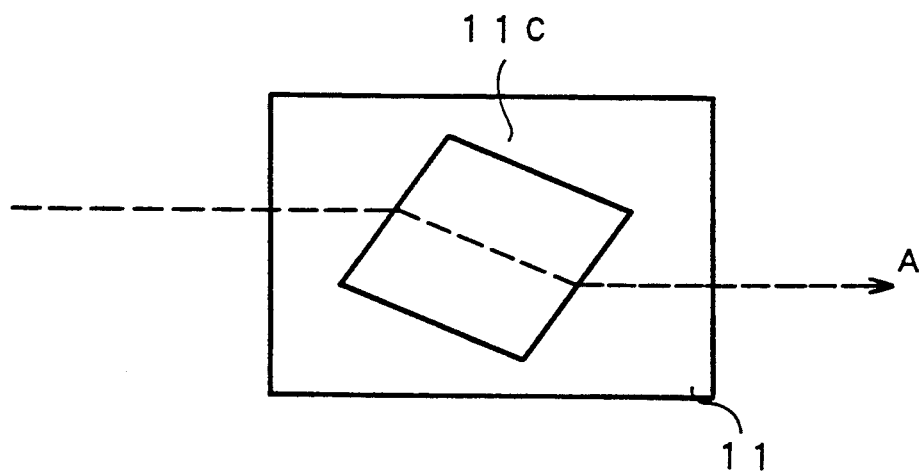

FIG. 3B shows a modification wherein a parallelogram opening 11c is formed in the mask 11. In this case, the optical path of the emission light A is shifted in parallel by the refractive index change region 10. Therefore, the emission light A cannot be extracted outside the cavity unless the optical path of the emission light A is largely moved.

Furthermore, the opening pattern of the mask 11 is not limited to the illustrated ones as long as the input and output surfaces 10a and 10b cross each other. For example, the mask 11 having a lens-shaped opening may be used. In this case, the refractive index can be changed by the outer shape and the like of the mask 11.

Figure 4:
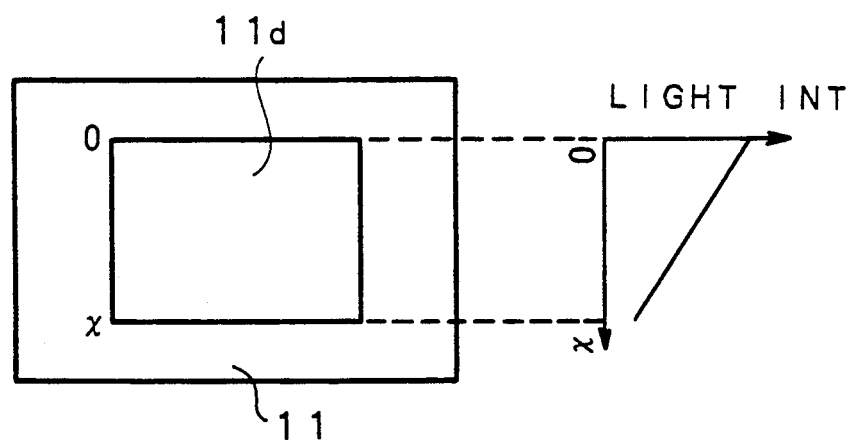
FIG. 4 shows another modification of the mask shown in FIG. 2.

FIG. 4 shows a modification wherein a filter 11d is arranged on the opening of the mask 11. The upper portion of the filter 11d has a high transmittance, and its lower portion has a low transmittance. Therefore, the intensity distribution of the pumping light passing through the filter 11d is as shown in a graph shown on the right side of FIG. 4. The upper portion of the guadrangular-prism refractive index change region 10 supplied with strong pumping light has a relatively high refractive index. As a result, the mask 11 shown in FIG. 4 is equivalent to the mask 11 having the inverse-triangular opening 11a shown in FIG. 2.

In this manner, when the light-light deflector 8 is used, the pulse oscillation of the laser light B can be attained in synchronism with the ON/OFF states of the pumping light P. More specifically, since switching can be optically realized, very high-speed switching characteristics, i.e., switching characteristics having a very small pulse width can be obtained. Furthermore, when the wavelengths and polarization of the pumping light and the emission light, or the axial direction of the light-light deflection member are controlled beforehand to obtain a considerable change in refractive index for light in a direction P in FIG. 2, and to obtain a small change in refractive index for light in a direction A, a pulse oscillation laser (semiconductor laser) capable of performing high-speed switching although it has low output power can be used as a light source of the pumping light P. Thus, a large-output, high-speed switching pulse laser (a pulse laser having a very small pulse width and large power) can be obtained by a low-output laser.

Figure 5:
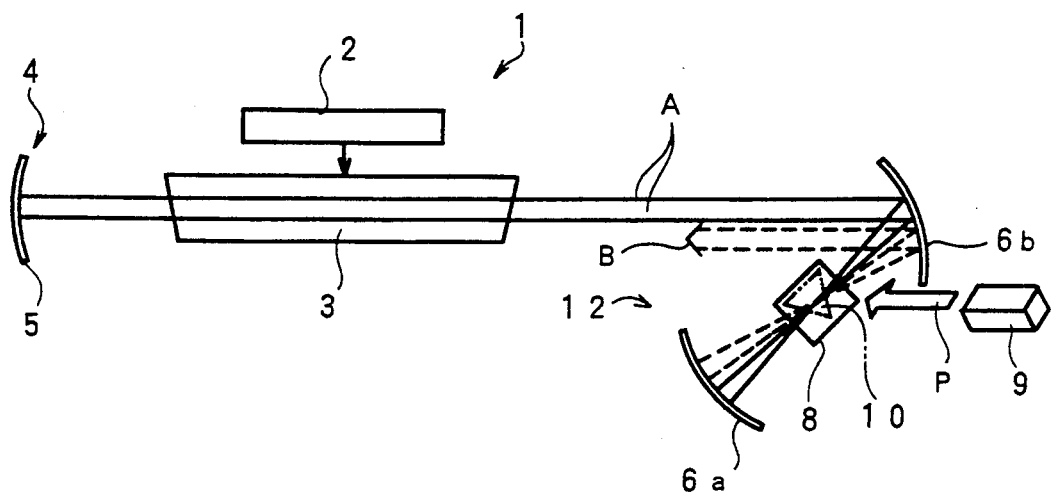
FIG. 5 is a diagram of a laser oscillator having a cavity damper.

The second embodiment of the present invention will be described below with reference to FIG. 5. This embodiment relates to a pulse laser 1 comprising a so-called cavity damper 12. In this pulse laser 1, a front mirror 6 comprises a pair of total reflection mirrors 6a and 6b, and these mirrors serve as both reflection and output mirrors. The mirror 6b is arranged at an intermediate position between a back mirror 5 and the mirror 6a, and a cavity is constituted by these three mirrors 5, 6a, and 6b. The cavity damper 12 is constituted by a light-light deflector 8 interposed between the mirrors 6a and 6b. Emission light A is deflected by the light-light deflector 8 to be extracted from the mirror 6b, as indicated by a broken line in FIG. 5. More specifically, a laser medium 3 is kept excited to reciprocate the emission light A in a laser resonator 4 constituting the cavity so as to maintain a laser oscillation state, thereby increasing internal energy. From this state, pumping light P for the light-light deflector 8 is set in the ON state to instantaneously form an equivalent prism in the deflector 8, thereby deflecting the emission light A. In this manner, the accumulated energy can be instantaneously extracted. Upon repetition of the ON/OFF states of the pumping light P, pulse laser light B is output.

In this manner, like in the above-mentioned embodiment, since the light-light deflector 8 is used, high-speed switching can be realized. Thus, the pulse laser light B having a small pulse width and a high peak output can be obtained by the high-speed switching. The pulse laser light B can be obtained in synchronism with the ON/OFF states of the pumping light P. In the second embodiment, when the cavity is formed for the ON state of the pumping light P by adjusting the angle of the mirror 6a to coincide with the deflection angle of the light-light deflector 8, pulse laser oscillation can be obtained in the OFF state of the pumping light P.

Figure 6:
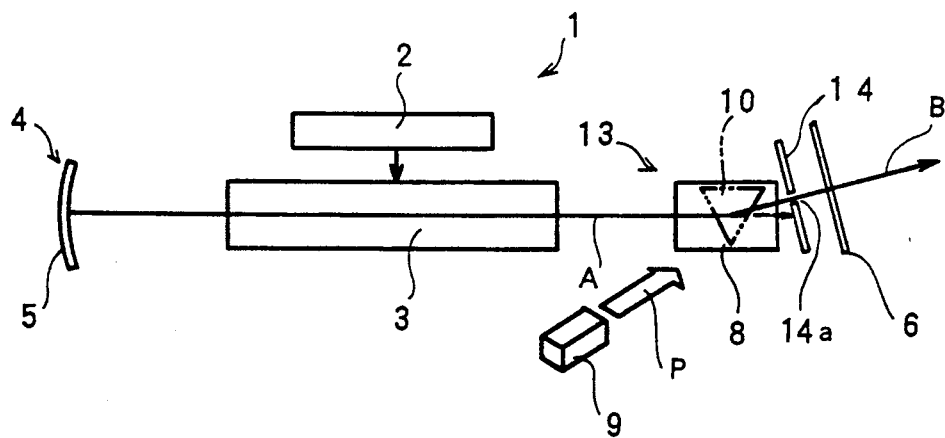
FIG. 6 is a diagram of a laser oscillator having a mode locker.

The third embodiment of the present invention will be described below with reference to FIG. 6. This embodiment relates to a pulse laser 1 comprising a so-called mode locker 13. In this pulse laser 1, a front mirror 6 formed of a partial transmission mirror, and the mode locker 13 is constituted by the mirror 6, a light-light deflector 8 inserted between a laser medium 3 and the front mirror 6, and an aperture 14. The position of a slit 14a of the aperture 14, and the angle of the front mirror 6 are adjusted to coincide with the deflection angle of the light-light deflector 8, and a cavity is formed between the front mirror 6 and a back mirror 5 in an ON state of pumping light. In this case, the distance between the front and back mirrors 6 and 5, i.e., the length of a resonator 4 is set to be c/(2.f) (where f is the repeating frequency of a pumping source 9). The light-light deflector 8 and the aperture 14 constitute a shutter (to be described later), and by utilizing opening/closing operations of the shutter, the phases of a large number of longitudinal modes simultaneously oscillated in the resonator 4 are locked.

The shutter is opened/closed upon repetition of the ON/OFF states of the pumping light P for the light-light deflector 8. The OFF state of the pumping light corresponds to a closed state for stopping light by the aperture 14, and the ON state corresponds to an open state wherein the emission light from a laser medium 3 is deflected, passes through the slit 14a of the aperture 14, and reaches the front mirror 6.

The pumping source 9 is turned on/off at the repeating frequency f (mode interval), and the shutter is opened/closed in synchronism with one reciprocal movement of the emission light A in the resonator 4, thus performing the same operation as in a case wherein the transmittance is changed in synchronism with one reciprocal movement. The emission light A which has passed the slit 14a is subjected to a higher transmittance every time it reciprocates in the resonator 4, and contrary to this, the non-synchronized emission light A is always subjected to a low transmittance. As a result, the emission light is concentrated on a portion having a high transmittance in association with the gain of the laser medium 3, and is finally output from the front mirror 6. Upon repetition of this operation, pulse laser light B is output.

In this manner, the high-speed opening/closing operation of the shutter can be performed in accordance with the ON/OFF states of the pumping light P, and the pulse laser light B having an extremely small pulse width and large peak power can be output. In this embodiment, the front and back mirrors 6 and 5 may be arranged parallel to each other, and the slit 14a of the aperture 14 may be arranged at a position of the resonator, where central light components pass. In this case, the opening state of the shutter can be defined by the OFF state of the pumping light P. In this embodiment, the aperture 14 may be omitted to perform the same operation as described above.

Figure 7:
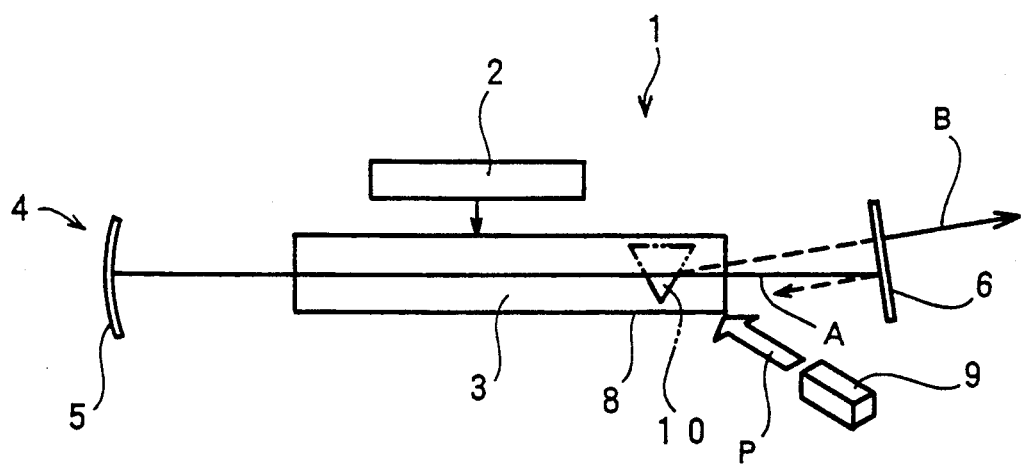
FIG. 7 is a diagram showing a modification of the laser oscillator.

FIG. 7 shows a modification of the light-light deflector 8 in the above-mentioned three embodiments. In this modification, the laser medium 3 itself comprises an optical crystal of a nonlinear medium which performs light-light deflection by external pumping light P, and the laser medium 3 and the light-light deflector 8 are integrally constituted. With this structure, the pulse laser 1 can be rendered compact, and optical axis alignment can be facilitated.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A pulse laser comprising:
    a laser resonator;
    a laser medium in said laser resonator for emitting an emission light; and
    deflecting means for switching an optical path of said emission light to output said emission light as a laser pulse, the deflecting means including,
    a deflecting member arranged in the optical path of said emission light, the deflection member having a refractive index which changes based on a pumping light incident thereon, and
    pumping means for radiating said pumping light on a predetermined region of said deflection member and varying the refractive index of said predetermined region to switch the optical path of said emission light.

2. A pulse laser according to claim 1, wherein said pumping means changes the refractive index of said predetermined region by adjusting an intensity of the pumping light radiated on said predetermined region of said deflection member.

3. A pulse laser according to claim 1, wherein a portion of said laser medium serves as said deflection member.

4. A pulse laser according to claim 1, wherein said pumping means comprises a light source for generating the pumping light, optical means for inputting the pumping light into said deflection member from a direction perpendicular to the optical path of the emission light, and mask means arranged in an optical path of the pumping light and having an opening for defining said predetermined region irradiated with the pumping light.

5. A pulse laser according to claim 4, wherein said mask means has a triangular opening, and said predetermined region irradiated with the pumping light has a prism shape having an axis thereof in a direction perpendicular to the optical path of the emission light in said deflection member.

6. A pulse laser according to claim 4, wherein said mask means has a rectangular opening, and said predetermined region irradiated with the pumping light has a quadrangular-prism shape having an axis thereof in a direction perpendicular to the optical path of the emission light in said deflection member, and the predetermined region has at least one side surface which crosses the optical path of the emission light at an angle slightly inclined from a right angle.

7. A pulse laser according to claim 1, wherein said pumping means comprises a pumping source for generating the pumping light, optical means for inputting the pumping light into said deflection member from a direction perpendicular to the optical path of the emission light, and filter means arranged in an optical path of the pumping light for nonuniformly adjusting a spatial distribution of radiation intensity of the pumping light.

8. A pulse laser according to claim 1, wherein said deflecting means constitutes a Q-switch, said Q-switch switching the optical path of the emission light from said laser medium to increase a Q value of said laser resonator, and extracting the emission light outside said laser resonator as a laser pulse.

9. A pulse laser according to claim 1, wherein said deflecting means constitutes a cavity damper, said cavity damper switching the optical path of the emission light from said laser medium and extracting the emission light which resonates in said laser resonator outside said laser resonator as a laser pulse.

10. A pulse laser according to claim 1, wherein said deflecting means constitutes a mode locker, said mode locker modulating the optical path of the emission light from said laser medium at a frequency equal to an interval of longitudinal modes, and extracting the emission light outside said laser resonator as a laser pulse beam.

* * * * *